3,474,099
Patented Oct. 21, 1969

3,474,099
4-PIPERAZINYL THIENOBENZOTHIAZEPINES
Jany Renz, Basel, Jean-Pierre Bourquin, Magden, Hans Winkler, Basel, and Pierre Gagnaux and Gustav Schwarb, Allschwil, Switzerland, assignors to Sandoz Ltd. (also known as Sandoz A.G.), Lichtstr, Basel, Switzerland
No Drawing. Filed June 6, 1967, Ser. No. 643,827
Claims priority, application Switzerland, June 7, 1966, 8,222/66; Oct. 27, 1966, 15,597/66; Mar. 30, 1967, 4,482/67
Int. Cl. C07d 51/70
U.S. Cl. 260—268                    15 Claims

ABSTRACT OF THE DISCLOSURE

The present invention provides compounds of formula

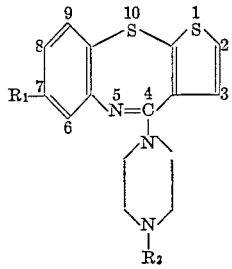

in which $R_1$ is hydrogen, lower alkyl, lower alkoxy, lower alkylthio, lower alkylsulphinyl, lower alkylsulphonyl, lower N,N-dialkylsulphamoyl, trifluoromethyl or cyano, chlorine or bromine, and $R_2$ is hydrogen, lower alkyl, 2-hydroxyethyl or 2-(alkanoyloxy)-ethyl, in which the alkanoyl radical contains 2 to 4 carbon atoms, and the pharmaceutically acceptable acid addition salts thereof. These compounds exhibit pronounced sedative/neuroleptic properties, while their cataleptic activity is low or lacking entirely. They furthermore have adrenolytic, histaminolytic and blood pressure lowering effects. The production of these compounds is furthermore described.

The present invention relates to new heterocyclic compounds and a process for their production.

The present invention relates to compounds of general Formula I,

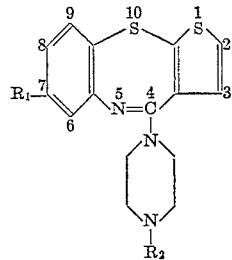

in which
$R_1$ signifies hydrogen, a lower alkyl, lower alkoxy, lower alkylthio, lower alkylsuphinyl, lower alkylsulphonyl, lower N,N-dialkylsulphamoyl radical, the trifluoromethyl or cyano radical, a chlorine or bromine atom, and
$R_2$ signifies hydrogen, a lower alkyl radical, the 2-hydroxyethyl radical or a 2-(alkanoyloxy)-ethyl radical, in which the alkanoyl radical contains 2 to 4 carbon atoms, and their acid addition salts.

The present invention further provides the following processes for the production of compounds of general Formula I and their acid addition salts:
(a) A compound of general Formula VIII,

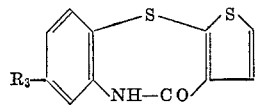

in which
$R_3$ signifies a hydrogen atom, a lower alkyl, lower alkoxy, lower alkylthio, lower alkylsulphonyl, lower N,N-dialkylsulphamoyl radical, the trifluoromethyl or cyano radical, a chlorine or bromine atom, is treated with a chlorinating or brominating agent in the presence of an acid-binding agent, to give a compound of general Formula II,

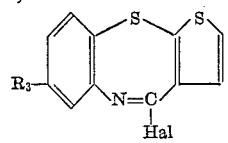

in which
$R_3$ has the above significance, and Hal signifies chlorine or bromine, this is reacted in the presence of an acid-binding agent with a compound of general Formula III,

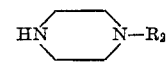

in which
$R_2$ has the above significance, and, when a compound I in which $R_1$ signifies alkylsulphinyl is desired, the corresponding compound I in which $R_1$ signifies an alkylthio radical is oxidized and, when an acid addition salt is required, salification is effected.

(b) Compounds of general Formula Ib,

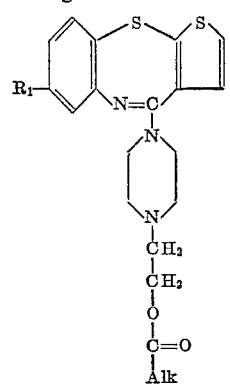

in which
$R_1$ has the above significance, and
Alk signifies an alkyl radical having 1 to 3 carbon atoms, are obtained by reacting a compound of general Formula Ic,

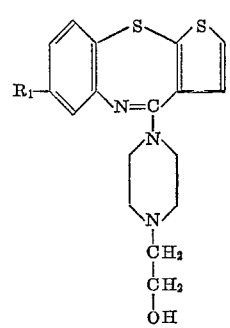

in which $R_1$ has the above significance, with an acid or a reactive functional acid derivative of an acid of general Formula IX,

in which Alk has the above significance, and, when an acid addition salt is required, salifying.

One preferred method of effecting the process of the invention for the production of compounds of general Formula I consists in treating a compound of general Formula VIII, preferably in an organic solvent, which is inert under the reaction conditions, e.g. xylene, with a suitable chlorinating agent, e.g. phosphorus oxychloride, or a brominating agent, e.g., phosphorous oxybromide, at a temperature between 80° and 120° C., preferably, however, at the boiling temperature of the solution, in the presence of an acid-binding agent, for example a tertiary organic base, e.g. dimethyl aniline, for 3 to 6 hours, and reacting the resulting compound of general Formula II with a compound of general Formula III. The reaction of the compound of general Formula II with a compound of general Formula III is preferably effected in an organic solvent which is inert under the reaction conditions, having a boiling point of at least 110° to at most 180° C., for example a corresponding aromatic hydrocarbon, e.g. xylene or benzene, preferably at the boiling temperature of the solution for about 3 to 6 hours. A tertiary aliphatic amine or preferably an excess of the compound of general Formula III may be used as acid-binding agent for the reaction of the invention. When an excess of the compound of general Formula III is used, this excess should amount to 100 to 400 percent. After the reaction has been compleetd, the reaction mixture is cooled, is diluted with the same solvent or another organic solvent which is inert under the reaction conditions, the solution is washed out with sodium hydroxide and water, and the reaction product is extracted from the organic phase with an aqueous acid solution, e.g. an aqueous tartaric acid solution. The crude reaction products are precipitated by making the acid extracts alkaline, and are then isolated and purified in manner known per se, e.g. by chromatography and/or recrystallization. The oxidation of the resulting compounds, in which $R_1$ signifies an alkylthio radical, is preferably effected with hydrogen peroxide or an alkali metal periodate in an organic water-immiscible solvent which is inert under the reaction conditions, e.g. a lower aliphatic alcohol, preferably in the presence of water. The oxidation with hydrogen peroxide is preferably effected at the boiling temperature of the solution, and the oxidation with an alkali metal periodate at room temperature. The compounds, in which $R_1$ signifies an alkylthio radical, are preferably used for oxidation in the form of their salts with strong organic or inorganic acids.

One preferred method of effecting the oxidation in accordance with the invention consists in dissolving the corresponding compound, in which $R_1$ signifies an alkylthio radical, in ethanol, acidifying the resulting solution with a solution of a suitable acid, e.g. hydrochloric acid, in the same solvent or another organic solvent which is inert under the reaction conditions, e.g. until acid to Congo Red indicator, and evaporating the resulting acid solution to dryness. The resulting salt is dissolved in the same solvent or another water-immiscible solvent which is inert under the reaction conditions and water, and 1.5 to 2 mols of hydrogen peroxide for every mol of the compound to be oxidized are added dropwise to the solution at the boil (when the oxidation is effected with an alkali metal periodate, a stoichiometric amount of this is used). The oxidation products are subsequently worked up and isolated in manner known per se, e.g. by concentration of the solution by evaporation and chromatography of the residue, and are purified in manner known per se, e.g. by salt formation. The compounds may be liberated from their salts with suitable strong bases, e.g. sodium hydroxide.

The process for the production of compounds of general Formula Ib is preferably effected by reacting a compound of general Formula Ic with a reactive functional acid derivative of an acid of general Formula IX. The chloride, bromide or the anhydride of an acid of general Formula IX may be used as reactive functional acid derivative.

The reaction of a compound of general Formula Ic with a chloride or bromide of a compound of general Formula IX is preferably effected in an organic solvent which is inert under the reaction conditions, e.g. chloroform, at a temperature between 0° and 60° C., preferably, however, at room temperature.

After the reaction has been completed, the acid portions which are present in the reaction solution are washed out with an aqueous solution of an inorganic base, e.g. potassium carbonate. The compounds of general Formula Ib obtained in accordance with the invention are isolated from the purified reaction solution and purified in manner known per se.

The resulting compounds of general Formula I may then optionally be converted into their acid addition salts with suitable organic or inorganic acids.

The compounds of general Formula VIII used as starting materials may be obtained by reacting a compound of general Formula IV,

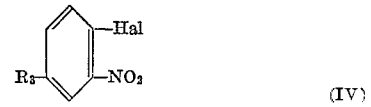

in which $R_3$ and Hal have the above significance, with 2-mercaptothiophene, preferably in a lower alcohol, e.g. methanol, and in the presence of an alkaline condensation agent, e.g. sodium hydroxide, reducing the resulting compounds of general Formula V,

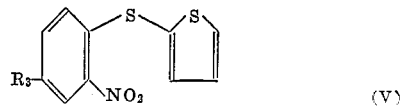

in which $R_3$ has the above significance, with nascent hydrogen, e.g. obtained by the action of dilute sulphuric acid on iron powder, to give a compound of general Formula VI,

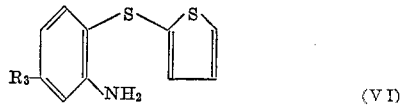

in which $R_3$ has the above significance, treating this with phosgene, and subjecting the resulting compound of general Formula VII,

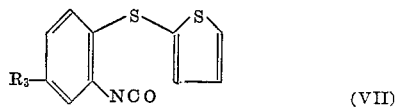

in which $R_3$ has the above significance, to a ring closure, for example by heating in an organic solvent which is inert under the reaction conditions, e.g. o-dichlorobenzene, in the presence of a suitable condensation agent, e.g. aluminium chloride, or by heating in polyphosphoric acid to 90–150° C. for ½ to 2 hours. The resulting compound of general Formula VIII is then isolated and purified in manner known per se.

The compounds of general Formula I are viscous or crystalline bases at room temperature. They form stable salts with organic or inorganic acids, which are crystalline at room temperature. Examples of acids for acid addition salt formation are: hydrochloric, hydrobromic, sulphuric, fumaric, maleic, tartaric or methanesulphonic acid.

The compounds of the invention and their acid addition salts are characterized by pronounced sedative/neuroleptic properties, while their cataleptic activity is low or lacking entirely. They furthermore have adrenolytic, histaminolytic and blood pressure lowering effects. The compound of general Formula I and their acid addition salts are therefore indicated for use in the treatment of psychoses, neuroses conditions of depression. They are further indicated for use in internal medicine in the treatment of psychosomatic dysfunctions, sleep disorders and illnesses of the circulatory system (hypertonia, anginal illnesses, peripheral blood circulation disorders). Of the compounds of the invention 4-(4-methyl-piperazinyl-1)-thieno[2,3 - b][1,5]-benzothiazepine and 7 - chloro-4 - (4-methyl-piperazinyl-1)-thieno[2,3 - b][1,5]benzothiazepine are especially useful in this respect.

A suitable dail ydose of compounds I is between 50 and 1,000 mg.

The compounds of the invention may be used as pharmaceuticals on their own or in the form of appropriate medicinal preparations for administration, e.g. enterally or parenterally. In order to produce suitable medicinal preparations the compounds are worked up with inorganic or organic adjuvants which are physiologically inert. Examples of such adjuvants are:

For tablets and dragées: lactose, starch, talcum and stearic acid;
For syrups: solutions of cane sugar, invert sugar and glucose;
For injectable solutions: water, alcohols, glycerin and vegetable oils;
For suppositories: natural or hardened oils and waxes.

The preparations may furthermore contain suitable preserving, stabilizing and wetting agents, solubilizers, sweetening and colourating substances and flavourings.

The term "in manner known per se" as used herein designates methods in use or described in the literature on the subject.

In the following non-limitative examples all temperatures are indicated in degrees Centigrades and are corrected.

EXAMPLE 1

7-chloro-4-(4-methyl-piperazinyl-1)-thieno [2,3-b] [1,5]benzothiazepine (a) 4-chloro-2-nitrophenyl-2'-thienylsulphide.—600 g. 2 - mercaptothiophene are added dropwise at room temperature during the course of 15 minutes to a solution of 207 g. of sodium hydroxide in 5,200 cc. of methanol. A total of 992 g. of 2,5-dichloronitrobenzene is then added in portions during the course of half an hour and the resulting reaction mixture is then boiled at reflux at a bath temperature of 90° for 5 hours. After cooling to 10° filtration and drying are effected. After crystallizing twice, each time from a threefold quantity of absolute ethanol, pure 4-chloro-2-nitrophenyl-2'-thienylsulphide, having a melting point of 76–78°, is obtained.

(b) 4- chloro-2-aminophenyl-2'-thienylsulphide.—310 cc. of 20% sulphuric acid are added dropwise at a bath temperature of 120° to a mixture of 443 g. of 4-chloro-2-nitrophenyl-2'-thienylsulphide, 287 g. of iron powder, 300 cc. of isopropyl alcohol and 2,000 cc. of water while stirring during the course of 1 hour and the mixture is then allowed to react for two hours. After cooling to 60°, 1,200 cc. of chloroform are added, cooling to room temperature and filtration are effected. The chloroform layer which has been separated from the filtrate is washed out with 200 cc. of water, dried over potassium carbonate, filtered and concentrated by evaporation. The evaporation residue is crystallized twice, each time from a threefold quantity of low-boiling petroleum ether. The resulting pure 4-chloro-2-aminophenyl-2'-thienyl-sulphide has a melting point of 46–48°.

(c) 4 - chloro - 2 - isocyanatophenyl - 2'-thienylsulphide.—A solution of 291 g. of 4-chloro-2-aminophenyl-2'-thienylsulphide in 1,900 cc. of toluene is added dropwise at —5° to 0° during the course of 1 hour to a solution of 230 g. of phosgene in 1,600 cc. of toluene while a weak stream of phosgene is passed through. The reaction mixture is slowly heated to an oil bath temperature of 140° and boiled at reflux for 15 minutes while phosgene is further passed through. Dry nitrogen gas is subsequently passed through during the course of 1 hour to remove the excess phosgene. The reaction solution is subsequently concentrated by evaporation and the evaporation residue is distilled in a high vacuum. Pure 4-chloro-2-isocyanatophenyl-2'-thienylsulphide distills at 140–150° and a pressure of 0.01 mm. Hg.

(d) 7 - chloro - 4,5 - dihydrothieno[2,3-b][1,5]benzothiazepin-4-one.—A solution of 240 g. of 4-chloro-2-isocyanatophenyl-2'-thienyl-sulphide in 850 cc. of o-dichlorobenzene is added dropwise at an internal temperature of 100° during the course of 15 minutes to a suspension of 105 g. of aluminum chloride in 850 cc. of o-dichlorobenzene and the resulting mixture is allowed to react at an internal temperature of 150° for one hour. After cooling to 20° the reaction mixture is poured on 1000 g. of ice and subjected to a steam distillation until all the o-dichlorobenzene has been removed. The distillation residue is filtered off, the filter residue is boiled with 1.4 litres of acetone, is filtered off and dried. After crystallizing from a five-fold quantity of dimethylformamide pure 7-chloro-4,5-dihydrothieno[2,3-b][1,5]benzothiazepin-4-one, having a melting point of 297–299°, is obtained.

(e) 4,7 - dichloro-thieno[2,3-b][1,5]benzothiazepine.—A mixture of 20.0 g. of 7-chloro-4,5-dihydroethieno[2,3-b][1,5]benzothiazepin-4-one, 5.43 g. of N,N-dimethylaniline and 150 cc. of phosphorus oxychloride is boiled at reflux at a bath temperature of 140° while stirring for 4 hours. The mixture is then completely concentrated by evaporation in a vacuum and the residue crystalled twice from benzene/petroleum ether. The resulting pure 4,7-dichloro-thieno[2,3-b][1,5]benzothiazepine has a melting point of 145–147°.

(f) 7-chloro - 4 - (4 - methyl-piperazinyl-1)thieno[2,3-b][1,5]benzothiazepine.—A mixture of 35.5 g. of 4.7-dichloro-thieno[2,3-b][1,5]benzothiazepine, 62.0 g. of monomethyl-piperazine and 240 cc. of xylene is boiled at reflux at a bath temperature of 180° while stirring for 5 hours. After cooling the mixture is diluted with 250 cc. of benzene, is shaken out with 50 cc. of 3 N sodium hydroxide and then twice with 75 cc. each of water. Extraction is subsequently effected with 350 cc. of 15% aqueous tartaric acid, this extract is washed out twice, each time with 50 cc. of benzene and is made alkaline with 90 cc. of concentrated sodium hydroxide. The precipitated base is shaken out with 350 cc. of benzene, the benzene extract is washed out with 100 cc. of water and concentrated by evaporation. After crystallizing the evaporation residue twice, each time from a ten-fold quantity of ethyl acetate, pure 7-chloro-4-(4-methyl-piperazinyl-1)-thieno[2,3-b][1,5]benzothiazepine having a melting point of 162–164°, is obtained.

EXAMPLE 2

7-chloro-4-[4-(2-hydroxyethyl)-piperazinyl-1]-thieno[2,3-b][1,5]benzothiazepine 18 g. of 4,7-dichloro-thieno[2,3-b][1,5]benzothiazepine and 40.9 g. of N-(2-hydroxyethyl)-piperazine are reacted in 150 cc. of xylene and worked up in a manner analogous to that described in Example 1 (f).

Fumarate 8.8 g. of the residue obtained after concentrating the benzene extract are dissolved with 2.82 g. of fumaric acid in 50 cc. of absolute ethanol, filtration and boiling are effected. After crystallizing from 25 cc. of absolute ethanol pure 7-chloro-4-[4-(2-hydroxyethyl)-piperazinyl-1]-thieno[2,3-b][1,5]benzothiazepine fumarate, having a melting point of 142–144°, is obtained.

EXAMPLE 3

4-(4-methyl-piperazinyl-1)-thieno[2,3-b][1,5]-benzothiazepine (a) 2-nitrophenyl-2'-thienylsulphide.—116 g. of 2-mercaptothiophene are added dropwise at room temperature while stirring during the course of 15 minutes to a solution of 40 g. of sodium hydroxide in 1 litre of methanol. 157 g. of 2-chloronitrobenzene are subsequently added and the resulting mixture is boiled at reflux at a bath temperature of 90° for 6 hours. Cooling is then effected to 10°, the resulting precipitate is filtered off and dried. After recrystallizing twice, each time from a five-fold quantity of absolute ethanol, pure 2-nitrophenyl-2'-thienylsulphide, having a melting point of 79–81°, is obtained.

(b) 2-aminophenyl-2'-thienylsulphide.—165 cc. of 50% sulphuric acid are added dropwise at a bath temperature of 120° while stirring during the course of 3 hours to a mixture of 500 g. of 2-nitrophenyl-2'-thienylsulphide, 530 g. of iron powder, 730 cc. of isopropyl alcohol and 1,200 cc. of water, the resulting reaction mixture is then allowed to react for a further hour and is subsequently cooled to 60°. 1 litre of chloroform and 80 g. of sodium carbonate are then added, the mixture is allowed to cool to room temperature and is then filtered. The chloroform layer which has been separated from the filtrate is washed out with 200 cc. of water, dried over potassium carbonate, filtered and concentrated. The evaporation residue is distilled in a high vacuum and the fraction which distils over at 105–115° and 0.04 mm. of Hg, i.e. 2-aminophenyl-2'-thienylsulphide, is collected.

(c) 2-isocyanatophenyl-2'-thienylsulphide.—A solution of 65 g. of 2-aminophenyl-2'-thienylsulphide in 500 cc. of toluene is added dropwise at —5 to 0° during the course of 1 hour to to solution of 60 g. of phosgene in 400 cc. of toluene while passing through a weak stream of phosgene. The reaction mixture is slowly heated to an oil bath temperature of 140° and is boiled at reflux for a further 15 minutes while phosgene is further passed through. Dry nitrogen gas is subsequently passed through for about 1 hour to remove the excess phosgene. The reaction solution is subsequently concentrated by evaporation and the evaporation residue is distilled in a high vacuum. Pure 2-isocyanatophenyl-2'-thienylsulphide distils over at 100–110° and a pressure of 0.03 mm. of Hg.

(d) 4,5 - dihydrothieno[2,3-b][1,5]benzothiazepin - 4-one.—A solution of 50 g. of 2-isocyanatophenyl-2'-thienylsulphide in 20 cc. of o-dichlorobenzene is added dropwise at an internal temperature of 100° during the course of 15 minutes to a suspension of 25 g. of aluminum chloride in 200 cc. of o-dichlorobenzene and the mixture is allowed to react at an internal temperature of 150° for 1 hour. After the reaction has been completed and cooling effected to 20°, the mixture is poured on 500 g. of ice and is then subjected to a steam distillation until all the o-dichlorobenzene has been distilled off. The distillation residue is filtered, the filter residue is boiled with 300 cc. of acetone, is filtered and dried. After crystallizing from a ten-fold quantity per volume of dimethyl formamide pure 4,5 - dihydrothieno[2,3 - b][1,5]benzothiazepin - 4 - one, having a melting point of 280–282°, is obtained.

(e) 4 - chloro - thienol[2,3-b][1,5]benzothiazepine.—A mixture of 30.0 g. of 4,5-dihydrothieno[2,3-b][1,5]-benzothiazepin-4-one, 9.35 g. of N,N-dimethylaniline and 260 cc. of phosphorus oxychloride is boiled at reflux at a bath temperature of 140° while stirring for 4 hours. The mixture is then completely concentrated by evaporation in a vacuum. The crude 4-chloro-thieno[2,3-b][1,5]-benzothiazepine obtained as evaporation residue is worked up further as such.

(f) 4 - (4 - methyl - piperazinyl - 1) - thieno[2,3 - b]-[1,5]benzothiazepine.—32.3 g. of 4-chloro-thieno[2,3-b]-[1,5]benzothiazepine, 64.3 g. of monomethyl-pipererazine and 250 cc. of xylene are boiled at reflux at a bath temperature of 180° while stirring for 1½ hours. After cooling to room temperature the mixture is diluted with 200 cc. of benzene, washing out is effected with 70 cc. of 3 N sodium hydroxide and then twice with 100 cc. each of water. Extraction is subsequently effected with 300 cc. of 15% aqueous tartaric acid, this extract is washed out twice with 75 cc. each of benzene and is made alkaline with 75 cc. of concentrated sodium hydroxide. The precipitated base is shaken out with 400 cc. of benzene, the benzene extract is washed out with 150 cc. of water and is concentrated by evaporation. After crystallizing the evaporation residue twice, each time from a five-fold quantity of absolute ethanol, pure 4-(4-methyl-piperazinyl-1)-thieno[2,3-b][1,5]benzothiazepine having a melting point of 112–114°, is obtained.

EXAMPLE 4

7-methyl-4-(4-methyl-piperazinyl-1)-thieno[2,3-b][1,5]-benzothiazepine (a) 4 - methyl - 2 - nitrophenyl - 2' - thienylsulphide.—453 g. of 2-mercaptothiophene are first added during the course of 15 minutes and then 668 g. of 4-chloro-3-nitrotoluene during the course of ½ hour to a solution of 186 g. of sodium hydroxide in 3.9 litres of methanol while stirring at room temperature. The mixture is subsequently boiled at reflux at a bath temperature of 90° for 5 hours. After cooling to 10° the mixture is filtered off, washed out with cold methanol and water and dried. After crystallizing from a three-fold quantity of absolute ethanol pure 4-methyl-2-nitrophenyl-2'-thienylsulphide, having a melting point of 80–82°, is obtained.

(b) 4 - methyl-2 - aminophenyl-2'-thienylsulphide.—290 cc. of 20% sulphuric acid are added dropwise while stirring during the course of one hour to a boiling mixture of 380 g. of 4-methyl-2-nitrophenyl-2'-thienylsulphide, 358 g. of iron powder, 250 cc. of isopropyl alcohol and 1.65 litres of water and the mixture is then boiled for a further 3 hours. After cooling to 60°, 1 litre of chloroform is added and filtration is effected at room temperature. The chloroform layer which has been separated from the filtrate is washed out with 200 cc. of water, dried over potassium carbonate and concentrated by evaporation. The evaporation residue is distilled in a high vacuum. The main fraction distils over at 130–139° and 0.08 mm. of Hg and is pure 4-methyl-2-aminophenyl-2'-thienylsulphide.

(c) 4 - methyl - 2 - isocyanatophenyl - 2' - thienylsulphide.—A solution of 454 g. of 4-methyl-2-aminophenyl-2'-thienylsulphide in 2.9 litres of toluene is added dropwise at —5 to 0° during the course of about one hour to a solution of 399 g. of phosgene in 2.6 litres of toluene while passing through a weak stream of phosgene. The reaction mixture is slowly heated to an oil bath temperature of 140° and boiled at reflux for 15 minutes while phosgene is further passed through. Dry nitrogen gas is subsequently passed through for about one hour to remove the excess phosgene. The reaction solution is concentrated by evaporation and distilled in a high vacuum. Pure 4-methyl-2-isocyanatophenyl-2'-thienylsulphide distils at 126–136° and a pressure of 0.01 mm. of Hg.

(d) 7 - methyl - 4,5 - dihydrothieno[2,3-][1,5]benzothiazepin-4-one.—A solution of 486 g. of 4-methyl-2-isocyanatophenyl-2'-thienylsulphide in 1.8 litres of o-dichlorobenzene is added dropwise at an internal temperature of 100° during the course of 15 minutes to a suspension of 228 g. of aluminium chloride in 1.8 litres of o-dichlorobenzene and the resulting reaction mixture is then allowed to react at an internal temperature of 150° for 1 hour. After cooling to 20° the reaction mixture is poured on 1,000 g. of ice and is subjected to a steam distillation until all the o-dichlorobenzene has been removed. The distillation residue is filtered off, the filter residue is boiled with 2.7 litres of acetone, is filtered off and dried. After crystallizing from a 4-fold quantity of dimethyl formamide pure 7-methyl-4,5-dihydrothieno[2,3-b][1.5]benzothiazepin-4-one, having a melting point of 257–259°, is obtained.

(e) 7 - methyl - 4 - chloro - thieno[2,3-b][1,5]benzothiazepine.—A mixture of 30.0 g. of 7-methyl-4,5-dihydrothieno[2,3-b][1,5]benzothiazepin-4-one, 8.8 g. of N,N-dimethylaniline and 245 cc. of phosphorus oxychloride is boiled at reflux at a bath temperature of 140° while stirring for two hours. The mixture is then completely concentrated by evaporating in a vacuum and the crude 7 - methyl-4-chloro-thieno[2,3-b][1,5]benzothiazepine obtained as residue is worked up further as such.

(f) 7 - methyl - 4 - (4 - methyl - piperazinyl - 1)thieno[2,3-b][1,5]benzothiazepine.—32.2 g. of 7-methyl-4-chloro-thieno[2,3-b][1,5]benzothiazepine, 60.7 g. of monomethyl-piperazine and 250 cc. of xylene are boiled at reflux at a bath temperature of 180° while stirring for 1½ hours. After cooling to room temperature the mixture is diluted with 200 cc. of benzene, is washed out with 70 cc. of 3 N sodium hydroxide and then twice with 100 cc. each of water. Extraction is subsequently effected with 300 cc. of 15% aqueous tartaric acid, the tartaric extract is washed out twice, each time with 75 cc. of benzene and is made alkaline with 75 cc. of concentrated sodium hydroxide. The precipitated base is shaken out with 400 cc. of benzene, the benzene extract is washed out with 150 cc. of water and is concentrated by evaporation. After crystallizing the evaporation residue twice, each time from a five-fold quantity of ethyl acetate, pure 7-methyl-4-(4-methyl-piperazinyl-1) - thieno[2,3 - b][1,5]benzothiazepine, having a melting point of 138–140°, is obtained.

EXAMPLE 5

7-bromo-4-(4-methyl-piperazinyl-1)-thieno[2,3-b][1,5]benzothiazepine (a) 4-bromo-2-nitrophenyl-2'-thienylsulphide.—The reaction and working up are effected in a manner analogous to that described in Example 4(a) using the following amounts: 69.3 g. of sodium hydroxide, 1,750 cc. of methanol, 201 g. of 2-mercaptothiophene and 486 g. 2,5-dibromonitrobenzene. After crystallization from ethanol pure 4-bromo-2-nitrophenyl-2'-thienylsulphide has a melting point of 61–63°.

(b) 4 - bromo-2-aminophenyl-2'-thienylsulphide.—The reaction and working up are effected in a manner analogous to that described in Example 4(b) using the following amounts: 442 g. of 4-bromo-2-nitrophenyl-2'-thienylsulphide, 331 g. of iron powder, 240 cc. of isopropyl alcohol and 1.6 litres of water. 280 cc. of 20% sulphuric acid are added dropwise. After crystallization from a threefold quantity of methanol pure 4-bromo-2-aminophenyl-2'-thienylsulphide has a melting point of 58–61°.

(c) 4 - bromo - 2 - isocyanatophenyl - 2' - thienylsulphide.—The reaction and working up are effected in a manner analogous to that described in Example 4(c) using the following amounts: 239 g. of phosgene are dissolved in 1.6 litres of toluene and 366 g. of 4-bromo-2-aminophenyl-2'-thienylsulphide in 2 litres of toluene are added dropwise. Pure 4-bromo-2-isocyanatophenyl-2'-thienylsulphide has a boiling point of 135–145° at 0.05 mm. Hg.

(d) 7 - bromo - 4,5-dihydrothieno[2,3-b][1,5]benzothiazepin-4-one.—The reaction and working up are effected in a manner analogous to that described in Example 4(d) using the following amounts: 132 g. of aluminium chloride are suspended in 1.1 litres of o-dichlorobenzene and 354 g. of 4-bromo-2-isocyanatophenyl-2'-thienylsulphide in 1.1 litres of o-dichlorobenzene are added dropwise. After crystallizing from a six-fold quantity of dimethyl formamide pure 7-bromo-4,5-dihydrothieno[2,3-b][1,5]benzothiazepin-4-one, having a melting point of 309–311°, is obtained.

(e) 7 - bromo - 4 - chloro-thieno[2,3-b][1,5]benzothiazepine.—The reaction and working up are effected in a manner analogous to that described in Example 4(e) using the following amounts: 50.0 g. of 7-bromo-4,5-dihydrothieno[2,3-b][1,5]benzothiazepin-4-one, 11.6 g. of N,N-dimethylaniline and 325 cc. of phosphorus oxychloride. The crude 7-bromo-4-chloro-thieno[2,3-b][1,5]benzothiazepine obtained as evaporation residue is worked up further as such.

(f) 7-bromo-4-(4-methyl-piperazinyl-1)-thieno[2,3-b][1,5]benzothiazepine.—The reaction and working up are effected in a manner analogous to that described in Example 4(f) using the following amounts: 52.9 g. of 7-bromo-4-chloro-thieno [2,3-b] [1,5] benzothiazepine, 80.0 g. of monomethyl-piperazine and 300 cc. of xylene. After crystallizing the benzene evaporation residue twice, each time from a ten-fold quantity of ethyl acetate, pure 7-bromo-4-(4-methyl-piperazinyl-1)-thieno[2,3-b][1,5] benzothiazepine, having a melting point of 163–165°, is obtained.

EXAMPLE 6

7-methoxy-4-(4-methyl-piperazinyl-1)-thieno[2,3-b][1,5]benzothiazepine (a) 4-methoxy-2-nitrophenyl-2'-thienylsulphide.—A solution of 66 g. of sodium hydroxide and 192 g. of 2-mercaptothiophene in 830 cc. of methanol is added at room temperature while stirring during the course of half an hour to a suspension of 310 g. of 4-chloro-3-nitroanisole in 830 cc. of methanol and the mixture is boiled at reflux for 22 hours. After cooling to room temperature 1.5 litres of water and 500 cc. of chloroform are added, the mixture is thoroughly shaken, the chloroform layer is separated, washed out with water, dried and concentrated. The evaporation residue is distilled in a high vacuum at 0.04 mm. Hg and the fraction which distils over at 150–170° is collected. After crystallizing from a four-fold quantity of absolute ethanol pure 4-methoxy-2-nitrophenyl-2'-thienylsulphide, having a melting point of 64–65°, is obtained.

(b) 4-methoxy-2-aminophenyl-2'-thienylsulphide.—The reaction and working up are effected in a manner analogous to that described in Example 4(b) using the following amounts: 311 g. of 4-methoxy-2-nitrophenyl-2'-thienylsulphide, 276 g. of iron powder, 185 cc. of isopropyl alcohol and 1.3 litres of water. 220 cc. of 20% sulphuric acid are added dropwise. 4-methoxy-2-aminophenyl-2'-thienylsulphide has a boiling point of 145–155° at 0.03 mm. Hg.

(c) 4-methoxy-2-isocyanatophenyl-2'-thienylsulphide.—The reaction and working up are effected in a manner analogous to that described in Example 4(c) using the following amounts: 178 g. of phosgene are dissolved in 1.2 litres of toluene and 220 g. of 4-methoxy-2-aminophenyl-2'-thienylsulphide in 1.5 litres of toluene are added dropwise. Pure 4-methoxy-2-isocyanatophenyl-2'-thienylsulphide has a boiling point of 140–150° at 0.03 mm. Hg.

(d) 7-methoxy-4,5-dihydrothieno[2,3-b][1,5]benzothiazepin-4-one.—A mixture of 27 g. of 4-methoxy-2-isocyanatophenyl-2'-thienylsulphide and 270 g. of polyphosphoric acid is heated at a bath temperature of 130° while stirring for 40 minutes. The reaction solution is subsequently poured on 1.5 litres of ice water, is neutralized with ammonia and filtered off. After crystallizing thrice from actone pure 7-methoxy-4,5-dihydrothieno[2,3-b][1,5]benzothiazepin-4-one, having a melting point of 210–212°, is obtained.

(e) 7-methoxy-4-chloro-thieno[2,3-b][1,5]benzothiazepine.—The reaction and working up are effected in a manner analogous to that described in Example 4(e) using the following amounts: 30.0 g. of 7-methoxy-4,5- dihydrothieno[2,3-b][1,5]benzothiazepin-4-one, 8.3 g. of N,N-dimethylaniline and 230 cc. of phosphorus oxychloride. The crude 7-methoxy-4-chloro-thieno[2,3-b][1,5] benzothiazepine obtained as evaporation residue is worked up further as such.

(f) 7-methoxy-4-(4-methyl-piperazinyl-1) - thieno[2,3-b][1,5]benzothiazepine.—The reaction and working up are effected in a maner analogous to that described in Example 4(f) using the following amounts: 32.0 g. of 7-methoxy - 4 - chloro - thieno [2,3-b][1,5] benzothiazepine, 57.0 g. of monomethyl-piperazine and 250 cc. of xylene.

Maleate 22.2 g. of the benzene evaporation residue and 7.82 g. of maleic acid are dissolved while hot in 125 cc. of absolute ethanol and cooling is then effected. After crystallizing from 110 cc. of absolute ethanol pure 7-methoxy-4-(4-methyl-piperazinyl-1)-thieno [2,3-b][1,5]-benzothiazepine maleate, having a melting point of 168–170°, is obtained.

EXAMPLE 7

7-methylthio-4-(4-methyl-piperazinyl-1)-thieno[2,3-b][1,5]benzothiazepine (a) 4 - methylthio - 2 - nitrophenyl-2′-thienylsulphide.—The reaction and working up are effected in a manner analogous to that described in Example 4(a) using the following amounts: 207 g. of sodium hydroxide, 5.2 litres of methanol, 600 g. of 2-mercaptothiophene and 1285 g. of 4-bromo-3-nitrothioanisole. After crystallizing from a twelve-fold quantity of absolute ethanol pure 4-methyl-mercapto-2-nitrophenyl-2′-thienylsulphide has a melting point of 80–82°.

(b) 4 - methylthio-2-aminophenyl-2′-thienylsulphide.—The reaction and working up are effected in a manner analogous to that described in Example 4(b) using the following amounts: 461 g. of 4-methylthio-2-nitrophenyl-2′-thienylsulphide, 387 g. of iron powder, 300 cc. of isopropyl alcohol and 2 litres of water. 310 cc. of 20% sulphuric acid are added dropwise. Pure 4-methylthio-2-aminophenyl-2′-thienylsulphide has a boiling point of 172–182° at 0.04 mm. Hg.

(c) 4 - methylthio - 2 - isocyanatophenyl - -2′-thienylsulphide.—The reaction and working up are effected in a manner analogous to that described in Example 4(c) using the following amounts: 231 g. of phosgene are dissolved in 1.5 litres of toluene and 305 g. of 4-methylthio-2-amiophenyl-2′-thienylsulphide in 1.9 litres of toluene are added dropwise. Pure 4-methylthio-2-isocyanatophenyl-2′-thienylsulphide has a boiling point of 165–173° at 0.02 mm. Hg.

(d) 7 - methylthio-4,5-dihydrothieno[2,3-b][1,5]benzothiazepin-4-one.—The reaction and working up are effected in a manner analogous to that described in Example 4(d) using the following amounts: 133 g. of aluminum chloride are suspended in 1.1 litres of o-dichlorobenzene and 310 g. of 4-methylthio-2-isocyanato-phenyl-2′- thienylsulphide in 1.1 litres of o-dichlorobenzene are added dropwise. After crystallizing from a two-fold quantity of dimethyl formamide pure 7-methylthio-4,5-dihydrothieno[2,3-b][1,5]-benzothiazepin-4-one, having a melting point of 211–213°, is obtained.

(e) 7 - methylthio - 4 - chloro-thieno[2,3-b][1,5]benzothiazepine.—The reaction and working up are effected in a manner analogous to that described in Example 4(e) using the following amounts: 40.0 g. of 7-methylthio-4,5,-dihydrothieno[2,3-b][1,5]benzothiazepin - 4 - one, 10.4 g. of N,N-dimethylaniline and 290 cc. of phosphorus oxychloride. The crude 7-methylthio-4-chloro-thieno[2,3-b][1,5]benzothiazepine obtained as evaporation residue is worked up further as such.

(f) 7-methylthio - 4 - (4-methyl-piperazinyl-1)-thieno[2,3-b][1,5]benzothiazepine.—The reaction and working up are effected in a manner analogous to that described in Example 4(f) using the following amounts: 42.6 g. of 7-methylthio-4-chloro-thieno[2,3-b][1,5]benzothiaze-pine, 71.6 g. of monomethyl-piperazine and 300 cc. of xylene. 43.4 g. of the crude evaporation residue are crystallized twice, each time from a ten-fold quantity of ethyl acetate, whereby pure 7-methylthio-4-(4-methyl-piperazinyl-1)-thieno[2,3-b][1,5]benzothiazepine, having a melting point of 167–169°, is obtained.

EXAMPLE 8

7-methylsulphonyl-4-(4-methyl-piperazinyl-1)-thieno[2,3-b][1,5]benzothiazepine (a) 4 - methylsulphonyl - 2 - nitrophenyl-2′-thienylsulphide.—A solution of 40 g. of sodium hydroxide and 116 g. of 2-mercaptothiophene in 800 cc. of ethanol is added dropwise while stirring during the course of half an hour to a boiling mixture of 235 g. of 4-chloro-3-nitro-methyl-sulphonyl-benzene in 3 litres of ethanol. The mixture is allowed to react for 3½ hours. After cooling to room temperature filtration and drying are effected. After crystallizing from a fourteen-fold quantity of ethanol pure 4-methylsulphonyl-2-nitrophenyl-2′-thienylsulphide, having a melting point of 178–180°, is obtained.

(b) 4-methylsulphonyl - 2 - aminophenyl-2′-thienylsulphide.—The reaction and working up are effected in a manner analogous to that described in Example 4(b) using the following amounts: 355 g. of 4-methylsulphonyl-2-nitrophenyl-2′-thienylsulphide, 283 g. of iron powder, 190 cc. of isopropyl alcohol and 1.3 litres of water. 250 cc. of 20% sulphuric acid are added dropwise. After crystallizing from a four-fold quantity of ethanol pure 4-methylsulphonyl - 2 - aminophenyl-2′-thienylsulphide, having a melting point of 70–72°, is obtained.

(c) 4 - methylsulphonyl-2-isocyanatophenyl-2′-thienylsulphide.—The reaction and working up are effected in a manner analogous to that described in Example 4(c) using the following amounts: 100 g. of phosgene are dissolved in 700 cc. of toluene and 153 g. of 4-methyl-sulphonyl-2-aminophenyl-2′-thienylsulphide in 1.6 litres of toluene are added dropwise. The crude 4-methylsulphonyl-2-isocyanatophenyl-2′-thienylsulphide obtained as evaporation residue is worked up further as such.

(d) 7 - methylsulphonyl - 4,5 - dihydrothieno[2,3-b][1,5]benzothiazepin-4-one.—A mixture of 70.3 g. of 4-methylsulphonyl - 2 - isocyanatophenyl-2′-thienylsulphide and 710 g. of polyphosphoric acid is heated at an oil bath temperature of 120° while stirring for one hour. The reaction solution is subsequently poured on 2.1 litres of ice water, the resulting mixture is neutralised with ammonia and filtered off. After crystallizing the filter residue from a five-fold quantity of glacial acetic acid and then from a ten-fold quantity of a mixture of 8 parts of ethanol and 2 parts of dimethyl formamide, pure 7-methylsulphonyl - 4,5 - dihydrothieno[2,3-b][1,5]benzothiazepin-4-one, having a melting point of 218–220°, is obtained.

(e) 7-methylsulphonyl - 4 - chloro-thieno[2,3-b][1,5] benzothiazepine.—The reaction and working up are effected in a manner analogous to that described in Example 4(e) using the following amounts: 30.0 g. of 7-methylsulphonyl - 4,5 - dihydrothieno[2,3 - b][1,5]benzothiazepin-4-one, 7.0 g. of N,N-dimethylaniline and 195 cc. of phosphorus oxychloride. The crude 7-methylsulphonyl-4-chloro - thieno[2,3-b][1,5]benzothiazepine obtained as evaporation residue is worked up further as such.

(f) 7 - methylsulphonyl-4 - (4 - methyl-piperazinyl-1)-thieno[2,3 - b][1,5]benzothiazepine.—The reaction and working up are effected in a manner analogous to that described in Example 4(f) using the following amounts: 31.7 g. of 7-methylsulphonyl-4-chloro-thieno[2,3-b[1,5] benzothiazepine, 48.2 g. of monomethyl-piperazine and 200 cc. of xylene.

Maleate 18.35 g. of the benzene evaporation residue and 5.7 g. of maleic acid are dissolved while hot in 100 cc. of absolute ethanol and cooling is then effected. After crystallizing froc 400 cc. of ethanol pure 7-methylsulphonyl- 4-(4-methyl-piperazinyl-1)-thieno[2,3-b][1,5]benzothiazepine maleate, having a melting point of 193–195° (decomposition) is obtained.

EXAMPLE 9

7-cyano-4-(4-methyl-piperazinyl-1)-thieno[2,3-b][1,5]benzothiazepine (a) 4 - cyano - 2 - nitrophenyl-2′-thienylsulphide.—A solution of 13.3 g. of sodium hydroxide and 38.7 g. of 2-mercaptothiophene in 170 cc. of methanol is added dropwise while stirring during the course of ¾ hour to a boiling mixture of 60.8 g. of 4-chloro-3-nitro-benzonitrile in 170 cc. of methanol. The resulting reaction mixture is allowed to react at the same temperature for 5½ hours. The mixture is subsequently cooled to room temperature, is filtered and the filter residue dried. After crystallizing the filter residue from absolute ethanol pure 4-cyano-2-nitrophenyl-2′-thienylsulphide, having a melting point of 137–139°, is obtained.

(b) 4 - cyano-2-aminophenyl - 2′ - thienylsulphide.— The reaction and working up are effected in a manner analogous to that described in Example 4(b) using the following amounts: 274 g. of 4-cyano-2-nitrophenyl-2′-thienylsulphide, 263 g. of iron powder, 500 cc. of isopropyl alcohol and 1.7 litres of water. 210 cc. of 20% sulphuric acid are added dropwise. The chloroform evaporation residue is distilled in a high vacuum. Pure 4-cyano-2-aminophenyl-2′-thienylsulphide has a boiling point of 165–175° at 0.07 mm. Hg.

(c) 4 - cyano - 2 - isocyanatophenyl - 2′ - thienylsulphide.—The reaction and working up are effected in a manner analogous to that described in Example 4(c) using the following amounts: 157 g. of phosgene are dissolved in 1.1 litres of toluene and 190 g. of 4-cyano-2-aminophenyl-2′-thienylsulphide in 1.3 litres of toluene are added dropwise. Pure 4-cyano-2-isocyanatophenyl-2′-thienylsulphide has a boiling point of 145–155° at 0.06 mm. Hg.

(d) 7 - cyano - 4,5 - dihydrothieno[2,3-b][1,5]benzothiazepin-4-one.—The reaction and working up are effected in a manner analogous to that described in Example 4(d) using the following amounts: 11.4 g. of aluminum chloride are suspended in 75 cc. of o-dichloro-benzene and 20 g. of 4-cyano-2-isocyanatophenyl-2′-thienylsulphide in 75 cc. of o-dichlorobenzene are added dropwise. After crystallizing from a seven-fold quantity of dimethyl formamide pure 7-cyano-4,5-dihydrothieno[2,3-b][1,5]benzothiazepin-4-one, having a melting point 339–341°, is obtained.

(e) 7 - cyano - 4 - chloro-thieno[2,3-b][1,5]benzothiazepine.—The reaction and working up are effected in a manner analogous to that described in Example 4(e) using the following amounts: 30.0 g. of 7-cyano-4,5-dihydrothieno[2,3-b][1,5]benzothiazepin-4-one, 8.4 g. of N,N-dimethylaniline and 235 cc. of phosphorus oxychloride. The crude 7-cyano - 4 - chloro-thieno[2,3-b][1,5]benzothiazepine obtained as evaporation residue is worked up further as such.

(f) 7 - cyano-4-(4-methyl-piperazinyl-1)-thieno[2,3-b][1,5]benzothiazepine.—The reaction and working up are affected in a manner analogous to that described in Example 4(f) using the following amounts: 32.2 g. of 7-cyano-4 - chloro-thieno[2,3-b][1,5]benzothiazepine, 58.3 g. of monomethyl-piperazine and 200 cc. of xylene. After crsytallizing the benzene evaporation residue twice, each time from a fifteen-fold quantity of dimethyl formamide, pure 7 - cyano-4-(4-methyl-piperazinyl-1)-thieno[2,3-b][1,5]benzothiazepine, having a melting point of 225–227°, is obtained.

EXAMPLE 10

7-chloro-4-(piperazinyl-1)-thieno[2,3-b][1,5]benzothiazepine

A mixture of 56.0 g. of 4,7-dichloro-thieno[2,3-b][1,5]benzothiazepine, 67.4 g. of anhydrous piperazine and 250 cc. of benzene is boiled at reflux while stirring for 4 hours. After cooling to room temperature the mixture is diluted with 250 cc. of benzene, is washed out first with 100 cc. of 3 N sodium hydroxide and then thrice with 75 cc. each of water and is concentrated by evaporation. The evaporation residue is treated with 200 cc. of 1.5 N hydrochloric acid while warm, is filtered off and the filtrate is made alkaline with concentrated sodium hydroxide. The precipitated oily base is extracted with 200 cc. of benzene, the benzene extract is washed out with water and concentrated by evaporation.

Maleate

The maleate is produced in 31.7 g. of the evaporation residue obtained above and 11.5 of maleic acid are dissolved while hot in 250 cc. of ethanol and cooling is then effected. After crystallizing from 1.3 litres of 80% ethanol pure 7 - chloro-4-(piperazinyl-1)-thieno[2,3-b][1,5]benzothiazepine maleate, having a melting point of 202–204° (decomposition) is obtained.

EXAMPLE 11

7-trifluoromethyl-4-(4-methyl-piperazinyl-1)-thieno[2,3-b][1,5]benzothiazepine (a) 4-trifluoromethyl - 2 - nitrophenyl-2′-thienylsulphide.—A solution of 17.8 g. of sodium hydroxide and 51.6 g. of 2-mercaptothiophene in 225 cc. of methanol is added dropwise while stirring during the course of ½ hour to a boiling solution of 100 g. of 4-chloro-3-nitro-trifluoromethylbenzene in 225 cc. of methanol. The resulting reaction mixture is allowed to react at the reaction temperature for 4 hours. The mixture is then cooled to room temperature, is filtered and the methanol is removed from the filtrate in a vacuum. The residue is dissolved in 500 cc. of chloroform, the resulting solution is washed out with water and concentrated by evaporation. The evaporation residue is distilled in a high vacuum and the fraction which distils over at 115–120° and 0.03 mm. Hg is collected. After crystallizing from a two-fold quantity of isopropyl alcohol pure 4-trifluoromethyl-2-nitrophenyl-2′-thienylsulphide, having a melting point of 48–49°, is obtained.

(b) 4-trifluoromethyl - 2 - aminophenyl-2′-thienylsulphide.—The reaction and working up are effected in a manner analogous to that described in Example 4(b) using the following amounts: 244 g. of 4-trifluoromethyl-2-nitrophenyl-2′-thienylsulphide, 204 g. of iron powder, 190 cc. of isopropyl alcohol and 1.3 litres of water. 200 cc. of 20% sulphuric acid are added dropwise. The chloroform evaporation residue is distilled in a high vacuum, whereby pure 4-trifluoromethyl-2-aminophenyl-2′-thienylsulphide distils over at 98–103° and 0.05 mm. Hg.

(c) 4-trifluoromethyl-2-isocyanatophenyl-2′-thienylsulphide.—The reaction and working up are effected in a manner analogous to that described in Example 4(c) using the following amounts: 135 g. of phosgene dissolved in 930 cc. of toluene and 193 g. of 4-trifluoromethyl-2-aminophenyl-2′-thienylsulphide in 1.2 litres of toluene.

Pure 4 - trifluoromethyl-2-isocyanatophenyl-2′-thienylsulphide distils at a temperature of 95–100° and a pressure of 0.03 mm. Hg.

(d) 7-trifluoromethyl - 4,5 - dihydrothieno[2,3-b][1,5]benzothiazepin-4-one.—A mixture of 20 g. of 4-trifluoromethyl-2-isocyanatophenyl-2′-thienylsulphide and 200 g. of polyphosphoric acid is heated at an oil bath temperature of 110° while stirring for 5 hours. The reaction solution is subsequently poured on 600 cc. of ice water, is neutralised with ammonia and filtered off. After crystallizing the filter residue from a two-fold quantity of dimethyl formamide pure 7-trifluoromethyl-4,5-dihydrothieno[2,3-b][1,5]benzothiazepin-4-one, having a melting point of 263–265°, is obtained.

(e) 7-trifluoromethyl-4-chloro-thieno[2,3-b][1,5]benzothiazepine.—8.36 cc. of phosphorus oxychloride are added dropwise at an oil bath temperature of 140° to a mixture of 25.0 g. of 7-trifluoromethyl-4,5-dihydrothieno

[2,3-b][1,5]benzothiazepin-4-one, 6.0 g. of N,N-dimethylaniline and 150 cc. of xylene while stirring during the course of ¼ hour and the resulting reaction mixture is further stirred at the same temperature for 2 hours. The resulting 7-trifluoromethyl - 4 - chlorothieno[2,3-b][1,5]benzothiazepine is used for the reaction described in Example 11(f) without isolation.

(f) 7 - trifluoromethyl - 4 - (4 - methyl - piperazinyl-1)thieno[2,3-b][1,5]benzothiazepine.—A solution of 41.5 g. of monomethyl-piperazine in 40 cc. of xylene is added dropwise at the reaction temperature described in Example 11(e) during the course of ½ hour to a solution of the 7-trifluoromethyl-4-chloro-thieno[2,3-b][1,5]benzothiazepine resulting after chlorination and the reaction mixture is subsequently kept at the reaction temperature while stirring for a further 5 hours. After cooling to room temperature the mixture is dissolved with 150 cc. of benzene, is then washed out with 50 cc. of 3 N sodium hydroxide and subsequently twice with 75 cc. each of water. The benzene solution is extracted with 200 cc. of 15% aqueous tartaric acid, the tartaric acid extract is washed out with 100 cc. of benzene, is made alkaline with 50 cc. of concentrated sodium hydroxide and the precipitated base is taken up in 300 cc. of benzene. The benzene solution is washed out with 100 cc. of water and concentrated by evaporation. The evaporation residue is crystallized twice, each time from 150 cc. of ethanol, whereby pure 7-trifluoromethyl - 4 - (4 - methyl - piperazinyl-1)-thieno[2,3-b][1,5]benzothiazepine, having a melting point of 153–155°, is obtained.

EXAMPLE 12

7-N,N-dimethylsulphamoyl-4-(4-methyl-piperazinyl-1)-thieno[2,3-b][1,5]benzothiazepine (a) 4 - N,N - dimethylsulphamoyl - 2 - nitrophenyl - 2'-thienylsulphide.—A solution of 40.0 g. of sodium hydroxide and 116 g. of 2-mercaptothiophene in 800 cc. of absolute ethanol is added dropwise while stirring during the course of ½ hour to a boiling solution of 264 g. of 4-chloro-3-nitro-N,N-dimethylsulphamoylbenzene in 2300 cc. of absolute ethanol and the reaction mixture is subsequently allowed to react at this temperature for a further 3 hours. The mixture is then cooled to 20°, the resulting precipitate is filtered off and dried. After crystallizing from a 4-fold quantity of toluene pure 4-N,N-dimethylsulphamoyl-2-nitrophenyl-2' - thienylsulphide, having a melting point of 173–175°, is obtained.

(b) 4 - N,N - dimethylsulphamoyl - 2 - aminophenyl-2'-thienylsulphide.—170 cc. of 20% sulphuric acid are added dropwise while stirring during the course of 1 hour to a mixture boiling at reflux of 288 g. of 4-N,N-dimethylsulphamoyl-2-nitrophenyl-2'-thienylsulphide, 210 g. of iron powder, 200 cc. of isopropyl alcohol and 1.35 litres of water and boiling is then effected for a further 4 hours. After cooling to 60° 1 litre of chloroform is added, cooling to room temperature and filtration are effected. The chloroform layer which has been separated from the filtrate is washed out with 200 cc. of water, dried over potassium carbonate and concentrated by evaporation. After crystallizing twice, each time from a six-fold quantity of absolute ethanol, pure 4-N,N-dimethylsulphamoyl-2-aminophenyl-2'-thienylsulphide, having a melting point of 96–98°, is obtained.

(c) 4 - N,N - dimethylsulphamoyl - 2 - isocyanatophenyl-2'-thienylsulphide.—A solution of 210 g. of 4-N,N-dimethylsulphamoyl-2-aminophenyl-2'-thienylsulphide in 1.1 litres of toluene is added dropwise at —5° to 0° during the course of 1 hour to a solution of 130 g. of phosgene in 900 cc. of toluene while passing through a weak stream of phosgene. The reaction mixture is slowly heated to an oil bath temperature of 140° and boiled at reflux for 15 minutes while phosgene is further passed through. Dry nitrogen gas is then passed through for about 1 hour to remove the excess phosgene, the reaction solution is subsequently evaporated to dryness and the resulting residue, i.e. crude 4-N,N-dimethylsulphamoyl-2-isocyanatophenyl-2'-thienylsulphide is used as such for the ring closure reaction described in Example 12(d).

(d) 7 - N,N - dimethylsulphamoyl - 4,5 - dihydrothieno[2,3-b][1,5]benzothiazepin-4-one.—A solution of 50 g. of 4-N,N-dimethylsulphamoyl-2-isocyanatophenyl-2'-thienylsulphide in 175 cc. of o-dichlorobenzene is added dropwise at an internal temperature of 100° during the course of 15 minutes to a suspension of 21.6 g. of aluminum chloride in 175 cc. of o-dichlorobenzene and the reaction mixture is subsequently allowed to react at an internal temperature of 150° for 1 hour. After cooling to 20° the reaction mixture is poured on 450 g. of ice and the resulting mixture is subjected to a steam distillation until all the o-dichlorobenzene has been removed. The distillation residue is filtered and dried. After crystallizing twice, each time from a twelve-fold quantity of toluene, pure 7-N,N-dimethylsulphamoyl-4,5-dihydrothieno[2,3-b][1,5]benzothiazepin-4-one, having a melting point of 190–192°, is obtained.

(e) 7 - N,N - dimethylsulphamoyl - 4 - chloro - thieno[2,3-b][1,5]benzothiazepine.—8.9 g. of phosphorus oxychloride are added dropwise at an oil bath temperature of 140° to a mixture of 30 g. of 7-N,N-dimethylsulphamoyl - 4,5-dihydrothieno[2,3-b][1,5]benzothiazepin-4-one, 6.4 g. of N,N-dimethylaniline and 200 cc. of xylene while stirring during the course of 15 minutes and the resulting reaction mixture is stirred at the same temperature for a further 2 hours. The resulting 7-N,N-dimethylsulphamoyl - 4 - chloro-thieno[2,3-b][1,5]benzothiazepine is used for the reaction described in Example 12(f) without isolation.

(f) 7 - N,N - dimethylsulphamoyl - 4 - (4 - methylpiperazinyl-1)-thieno[2,3-b][1,5]benzothiazepine.—A solution of 44.1 g. of monomethyl-piperazine in 45 cc. of xylene is added dropwise at the reaction temperature described in Example 12(e) during the course of ½ hour to a solution of the 7-N,N-dimethylsulphamoyl-4-chlorothieno[2,3-b][1,5]benzothiazepine obtained after chlorination and the reaction mixture is subsequently kept at the reaction temperature while stirring for a further five hours. After cooling to room temperature the mixture is diluted with 150 cc. of benzene, is then washed out with 50 cc. of 3 N sodium hydroxide and subsequently twice with 75 cc. each of water. The benzene solution is then extracted with 200 cc. of 15% aqueous tartaric acid, the tartaric acid extract is washed out with 100 cc. of benzene, is made alkaline with 50 cc. of concentrated sodium hydroxide and the precipitated base is taken up in 300 cc. of benzene. After washing out the benzene solution with 100 cc. of water it is concentrated by evaporation. The evaporation residue is crystallized twice, each time from a five-fold quantity of acetone for purification. The resulting pure 7-N,N-dimethylsulphamoyl-4-(4-methyl-piperazinyl-1)-thieno[2,3-b][1,5]benzothiazepine has a melting point of 177–179°.

EXAMPLE 13

7-methylsulphinyl-4-(4-methyl-piperazinyl-1)-thieno[2,3-b][1,5]benzothiazepine 10.0 g. of 7-methylthio-4-(4-methyl-piperazinyl-1)-thieno[2,3-b][1,5]benzothiazepine are dissolved in 100 cc. of ethanol, the solution is made acid to Congo Red with a solution of hydrogen chloride in ethanol and is completely concentrated by evaporation. The evaporation residue is dissolved in 100 cc. of ethanol and 40 cc. of water and a solution of 2.9 cc. of hydrogen peroxide (35.9%) in 10 cc. of ethanol is added dropwise at a bath temperature of 110° while stirring during the course of ½ hour. After boiling at reflux for a further hour the reaction mixture is concentrated in a vacuum. The evaporation residue is shaken thoroughly with 75 cc. of water, 75 cc. of chloroform and 20 cc. of concentrated sodium hydroxide and the separated chloroform layer is washed out with 25 cc. of water. After drying over sodium sulphate, concentration is effected. The evaporation residue is dissolved in 25 cc. of benzene absorbed on 60 g. of silica gel. The first eluate, i.e. 600 cc. of benzene, 2.2 litres of benzene +1% of methanol and 60 cc. of benzene +2.5% of methanol are discarder and the following 900 cc. of benzene +2.5% methanol eluate are concentrated.

Fumarate 0.6 g. of the evaporation residue obtained above and 0.22 g. of fumaric acid are dissolved at the boil in 10 cc. of absolute ethanol and cooling is then effected. After crystallizing from 100 cc. of ethanol pure 7-methylsulphinyl-4-(4 - methyl-piperazinyl - 1)-thieno[2,3-b][1,5] benzothiazepine fumarate having a decomposition point of 226–228°, is obtained.

EXAMPLE 14

7-chloro-4-[4-(2-acetoxyethyl)-piperazinyl-1]-thieno[2,3-b][1,5]benzothiazepine

A solution of 7 cc. of acetyl chloride in 150 cc. of chloroform is added dropwise at room temperature while stirring to a solution of 25.0 g. of 7-chloro-4-[4-(2-hydroxyethyl) - piperazinyl - 1]thieno[2,3-b][1,5]benzothiazepine in 125 cc. of chloroform and the resulting reaction mixture is allowed to stand for 1 hour. The mixture is then washed out with an ice-cold solution of 28.5 g. of potassium carbonate in 100 cc. of water, then twice with 75 cc. each of ice-cold water, is dried over potassium carbonate and concentrated by evaporation.

Maleate 28.6 g. of the evaporation residue and 8.27 g. of maleic acid are dissolved at the boil in 150 cc. of absolute ethanol and the solution is then allowed to crystallize at 0°. After crystallizing from 600 cc. of absolute ethanol pure 7-chloro - 4 - [4-(2-acetoxyethyl)-piperazinyl-1]-thieno[2,3-b][1,5]benzothiazepine maleate, having a melting point of 165–167°, is obtained.

What is claimed is:
1. A compound selected from the group consisting of a compound of formula:

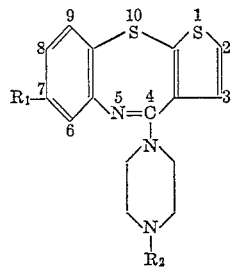

in which $R_1$ is hydrogen, lower alkyl, lower alkoxy, lower alkylthio, lower alkylsulphinyl, lower alkylsulphonyl, lower N,N-dialkylsulphamoyl, trifluoromethyl or cyano, chlorine or bromine, and $R_2$ is hydrogen, lower alkyl, 2-hydroxyethyl or 2-(alkanoyloxy)-ethyl, in which the alkanoyl group has 2 to 4 carbon atoms, and a pharmaceutically acceptable acid addition salt thereof.

2. A compound according to claim 1, in which the compound is 7-chloro-4-(4-methyl-piperazinyl-1)-thieno[2,3-b][1,5]benzothiazepine.

3. A compound according to claim 1, in which the compound is 7-chloro-4-[4-(2-hydroxyethyl)-piperazinyl-1]-thieno[2,3-b][1,5]benzothiazepine.

4. A compound according to claim 1, in which the compound is 4 - (4-methyl-piperazinyl-1)-thieno[2,3-b][1,5]benzothiazepine.

5. A compound according to claim 1, in which the compound is 7-methyl-4-(4-methyl-piperazinyl-1)-thieno[2,3-b][1,5]benzothiazepine.

6. A compound according to claim 1, in which the compound is 7-bromo-4-(4-methyl-piperazinyl-1)-thieno[2,3-b][1,5]benzothiazepine.

7. A compound according to claim 1, in which the compound is 7-methylsulphonyl-4-(4-methyl-piperazinyl-1)-thieno[2,3-b][1,5]benzothiazepine.

8. A compound according to claim 1, in which the compound is 7 - methylthio-4-(4-methyl-piperazinyl-1)-thieno[2,3-b][1,5]benzothiazepine.

9. A compound according to claim 1, in which the compound is 7-methylsulfonyl-4-(4-methyl-piperazinyl-1)-thieno[2,3-b][1,5]benzothiazepine.

10. A compound according to claim 1, in which the compound is 7-cyano-4-(4-methyl-piperazinyl-1)-thieno[2,3-b][1,5]benzothiazepine.

11. A compound according to claim 1, in which the compound is 7 - chloro-4-(piperazinyl-1)-thieno[2,3-b][1,5]benzothiazepine.

12. A compound according to claim 1, in which the compound is 7-trifluoromethyl-4-(4-methyl-piperazinyl-1)-thieno[2,3-b][1,5]benzothiazepine.

13. A compound according to claim 1, in which the compound is 7-N,N-dimethylsulphamoyl - 4 - (4-methyl-piperazinyl-1)-thieno[2,3-b][1,5]benzothiazepine.

14. A compound according to claim 1, in which the compound is 7-methylsulphinyl-4-(4-methyl-piperazinyl-1)-thieno[2,3-b][1,5]benzothiazepine.

15. A compound according to claim 1, in which the compound is 7-chloro - 4 - {4-(2-acetoxyethyl)-piperazinyl-1}thieno[2,3-b][1,5]benzothiazepin.

References Cited

UNITED STATES PATENTS 3,272,826   9/1966   Jucker et al. _____ 260—293.4
3,359,271  12/1967   Schindler et al. ____ 260—268
3,389,139   6/1968   Schmutz et al. ____ 260—268

DONALD G. DAUS, Primary Examiner

U.S. Cl. X.R.

260—329, 332.3, 332.5, 465, 544, 505, 577, 609, 646, 687, 694